United States Patent [19]

Basque et al.

[11] B 3,923,968
[45] Dec. 2, 1975

[54] METHOD OF PREPARING TITANIUM DIOXIDE PIGMENT

[75] Inventors: Max G. Basque, Pittsburgh; James E. Magner, Antioch; Joseph P. Surls, Walnut Creek; Ben F. West, Orinda, all of Calif.

[73] Assignee: The Dow Chemical Company, Midland, Mich.

[22] Filed: Mar. 1, 1973

[21] Appl. No.: 336,978

[44] Published under the Trial Voluntary Protest Program on January 28, 1975 as document no. B 336,978.

Related U.S. Application Data

[62] Division of Ser. No. 189,827, Oct. 18, 1971, Pat. No. 3,749,764.

[52] U.S. Cl. ............... 423/611; 423/610; 106/300
[51] Int. Cl.$^2$............................................ C01G 23/04
[58] Field of Search.................. 423/611, 612, 610; 106/300

[56] References Cited
UNITED STATES PATENTS

| | | | |
|---|---|---|---|
| 3,329,484 | 7/1967 | Long et al. | 423/611 |
| 3,528,773 | 9/1970 | Surls et al. | 423/612 |
| 3,635,671 | 1/1972 | Tveter et al. | 423/611 |
| 3,703,357 | 11/1972 | Surls et al. | 423/611 |
| 3,749,764 | 7/1973 | Basque et al. | 423/611 |

*Primary Examiner*—Edward Stern
*Attorney, Agent, or Firm*—J. Roger Lochhead; R. R. Stringham

[57] ABSTRACT

Elongate monocrystalline rutile nucleus crystals are mixed with an acidic titanium chloride solution which contains from 0.1 to 60 grams of dissolved titanium per liter, from 0.004 to 9 gram ions of chloride per liter and little or no phosphate, sulphate or bisulphate. The mixture is heated at a temperature of from 80° to 150°C., thereby producing composite titanium dioxide pigment particles consisting each of one or more nucleus crystals surrounded by elongate rutile crystallites in generally parallel array together with interstitial non-rutile titanium dioxide. The pigment particles have aspect ratios of from 3 to 150, effective diameters of from 0.05 to 0.3 microns and contain not more than about 10 weight percent of the non-rutile titanium dioxide.

5 Claims, No Drawings

METHOD OF PREPARING TITANIUM DIOXIDE PIGMENT

This application is a divisional application filed under Patent Office Rule 60 and derived from parent application, Ser. No. 189,827, filed Oct. 18, 1971, now matured into U.S. Pat. No. 3,749,764.

BACKGROUND OF THE INVENTION

It is known to make rutile pigments by several different processes involving hydrolysis of acidic titanium sulfate or chloride solutions in the presence of relatively minor proportions of colliodal "seed" suspensions. The hydrolysates obtained from sulfate solutions in such processes consist of anatase — which has a lower refractive index than rutile and is thus a poorer pigment — and have either been used as such or have been upgraded to rutile by calcining.

U.S. Pat. No. 3,329,484 to Long, et al., is directed to a hydrothermal process for the production of rutile pigments from acidic titanium chloride solutions such as iron-free leaches of ilmenite ores. By use of a colliodal rutile seed prepared in a specified manner and at hydrolysis temperatures of at least 130°, hydrolysates consisting of "acicular" rutile monocrystals are taught to be obtained. These crystals range in diameter from 0.05 to 0.2 microns and have aspect ratios of from 3 to 15. They have utility as paint pigments exhibiting Reynolds tinting strengths of from 900 to about 2,000. The maximum tinting strengths are shown by those crystals about 0.1 micron in diameter and having a length to diameter ratio of about 8.

At the temperatures (at least 175°, preferably 210°–260°C.) and chloride concentrations (about 8–10, preferably about 9) required for attainment of tinting strengths above 1,350 (without calcining) by the process of the '484 patent, the hydrolysis mixture is very corrosive and exerts a considerable vapor pressure. To operate under these conditions necessitates the use of costly materials of construction and imposes high design pressures. The poorer quality pigments obtained under less severe conditions of corrosivity and stress can be upgraded to high tinting strengths by calcining. However, calcining is expensive.

U.S. Pat. No. 3,528,773 to Surls, et al., teaches an alternative two-step hydrothermal route to high tinting strength rutile monocrystals of the preceding type. In the first step a seeded titanium chloride solution which contains from 6 to 11 gram ions of chloride per liter is hydrolyzed at a temperature of 85°–150°C. The resulting hydrolysate particles are then mixed with a less volatile and/or corrosive acid, such as nitric acid or with considerably more dilute (usually less than 3 molar) hydrochloric acid and heated to a temperature of 175°–300°C. for at least 15 minutes. This process offers a considerably more practicable operation than that of the '484 patent, but it would still be highly desirable if a hydrothermal process could be devised in which temperatures in excess of about 150°C. are not required in any step of the procedure.

SUMMARY OF THE INVENTION

The invention resides in a composite titanium dioxide pigment particle of controlled size and shape for high efficiency of light scattering in disperse systems, and in the process by which the particle is made. It has been discovered that the particle of the instant invention can be made by a sequence of operations in which temperatures greater than 150°C. are not required in any step. The last operation in this sequence is a hydrolysis and broadly constitutes the process of the instant invention.

Elongate rutile monocrystals are contacted at 80°–150°C. for at least 3 minutes with an acidic aqueous titanium chloride solution which contains little or no phosphate, sulphate or bisulphate. The monocrystals, individually or as clusters of several crystals, act as nuclei around which a major portion of the titanium dioxide hydrolysate deposits in the form of elongate rutile crystallites having their long axes generally parallel to the long (c) axes of the nuclei crystals, the balance of the hydrolysate depositing as non-rutile titanium dioxide between the nucleus crystals and/or the crystallities. The titanium chloride solution has a titanium content of from 0.1 to 60 grams per liter and a chloride content of from 0.004 to 9 gram ions per liter. The mixture is maintained within the temperature range of 80–150°C. until the particles present have grown to the desired average effective diameter. The weight of the solid phase at this point, $w_p$, can be estimated as $w_p = w_n(d_p/d_n)^2$, where $w_n$ is the weight of nuclei crystals charged, $d_p$ is the average effective diameter desired for the product particles and $d_n$ is the average diameter of the nculei crystals.

It is preferred to prepare the nuclei crystals at temperatures not in excess of 150°C., but the invention can be practiced with nucleants made at higher temperatures and is not restricted to the use of nuclei crystals made under any one set of conditions or in any particular manner.

The composite titanium dioxide pigment particles prepared have a length within the range of from 0.15 to 15 microns.

The product particles of the invention have utility for both paint pigmentation and paper opacification.

DETAILED DESCRIPTION OF THE INVENTION

Suitable nuclei crystals for the practice of the invention are rutile monocrystals from 0.15 to 15 microns long, from 0.01 to 0.1 microns in diameter and having aspect ratios of from 5 to 200 or more.

Because the ratio of end surface area to lateral surface area is relatively small for the nuclei crystals, accretion of hydrolysate results almost exclusively in cross-sectional growth of the developing particle. This is particularly so for nuclei of higher aspect ratios, in which case end growth is essentially nil. Consequently, the weight increase required to convert nuclei of a given diameter, $d_n$, to product particles of a desired effective diameter, $d_p$, is readily calculated from the fact (assuming one nucleus crystal per product particle) that the volume ratio of the product particle to the nucleant crystal is equal to the ratio of the squares of their respective diameters. That is, $V_p/V_n = d_p^2/d_n^2$. Since the density is the same for both nucleant and product, the weight ratio may be substituted for the volume ratio. Thus, $w_p/w_n = d_p^2/d_n^2$ and $w_p = w_n(d_pd_n)^2$, where these terms are defined as above. In discussing the results of variations in reaction parameters in the working examples herein, the term "growth ratio" is used. This term refers to the ratio $w_p/w_n$.

The most preferred products made by the instant process are those of a relatively narrow size distribution and having the average effective diameter (about 0.1 micron) at which acicular rutile pigment particles are most efficient in light scattering. Accordingly, and for practical reasons of process efficiency, it is preferred to employ a nucleant having a maximum content of uniformly sized nucleus needles with diameters of about 0.01 to 0.04 microns (100 to 400 Angstroms) and a minimum length of about 1 micron (10,000 Angstroms).

For maximum nucleant utilization and product uniformity, the nucleus crystals are so well dispersed in the liquid phase that not more than one crystal is contained in each product particle. However, as a practical matter, complete separation of nucleus crystals is not required and no loss in product quality results if a substantial proportion of the product particles comprise several nucleus crystals each. Of course, the product particles will be somewhat reduced in number and larger in diameter at a given growth ratio when ideal dispersion of the nucleus crystals is not achieved. This can be countered by decreasing the growth ratio at which the hydrolysis is terminated by a small amount which is readily determined empirically. As a first approximation, the weight of solid phase at which the hydrolysis is to be terminated can be estimated from the preceding definition of growth ratio.

Preferably, the nucleant employed consists solely of the specified rutile monocrystals. However, minor amounts of impurities, such as anatase or brookite forms of $TiO_2$, or of inert materials have little noticeable effect. Even nucleants comprising as much as 30 wt. % of non-rutile $TiO_2$ particles are operable. It is only necessary that the nucleant be so composed as to permit contacting of the elongate monocrystals present therein with the titanium chloride solution under the specified conditions of temperature and multivalent anion concentration.

The process of the invention can be carried out batchwise or as a continuous operation. In batch operation, the entire amounts of nucleant and titanium chloride solution are usually combined at once. In a semi-continuous mode of reaction, an initial mixture of nucleant and chloride solution is brought to temperature and then additional chloride solution is added at a rate such as to provide the desired concentration of dissolved titanium in the liquid phase. This usually amounts to adding dissolved titanium at a rate equal to the prevailing hydrolysis (and growth) rate, so that the concentration of dissolved titanium remains essentially constant. In a truly continuous embodiment, nucleant and titanium chloride solution can be metered to an agitated slurry of growing particles at the same rate at which the resulting mixture is withdrawn from the reactor. In this mode of operation, the percent of solids in the slurry is maintained at a sufficiently low level that the stirring input required to keep the reaction mixture essentially homogenous does not result in excessive shear and/or power demand.

Suitable titanium chloride solutions for the practice of the invention contain from 0.1 to 60 grams (0.002 to 1.25 g. atoms) of dissolved titanium, from 0.004 to 9 gram ions per liter of chloride, not more than 0.001 gram ions of phosphate per liter and not more than 0.01 gram ions of sulphate and/or bisulphate per liter.

Although the exact nature of the titanium chloride species present in the solutions employed in the practice of the invention is not certain, it is convenient to represent such solutions as consisting of water, $TiOCl_2$, $H^+$ and $Cl^-$ (the latter three presumably being hydrated). In stating the gram ions of "chloride" contained in the solution, the chloride content of the TiOCl2 is ordinarily counted as though complete hydrolysis had already occurred, according to the reaction $TiOCl2 + H_2O \rightarrow TiO_2 \downarrow + 2HCl$.

If it is desired to estimate the hydrogen ion concentration in the liquid phase at any given stage of hydrolysis, the assumption can be made that the nominal concentration of $H^+$ is equal to the concentration of chloride actually present as $Cl^-$ (excluding that present as $TiOCl_2$). That is, the hydrogen ion concentration is approximately equal to the gram atoms of "chloride" less twice the gram atoms of dissolved titanium (per liter). It will be seen, however, that it is not necessary to specify ($H^+$) or pH (in addition to the titanium and "chloride" contents) in order to characterize the solution.

It will be recognized that, as here defined, the "chloride content" does not change as a result of hydrolysis.

The hydrolysis reaction is carried out, preferably with agitation, by heating the mixture of nucleant and titanium chloride solution to a temperature within the range of 80° to 150°C. and thereafter maintaining the mixture within this temperature range until the weight of the solid phase therein corresponds to the desired growth ratio. The time required to secure the requisite weight increase with a given nucleant/chloride solution combination under a given set of conditions is readily determined by a series of several pilot hydrolyses terminated (as by rapid cooling) after successively longer contact times. The titanium chloride solution can be brought to the desired hydrolysis temperature before being mixed with the nucleant, but preferably this is accomplished rapidly and the nucleant is introduced as soon as possible after the solution reaches a temperature of 80°C. It is also feasible to add more titanium chloride solution as the hydrolysis proceeds. The hydrolysis is carried out in a reactor having an acid resistant interior surface and, preferably, fitted with means — such as a rocker, stirrer or slurry circulation pump — for agitation of the reactor contents.

If the hydrolysis is carried out at a temperature (greater than about 105°C.) such that significant losses of water or acid could occur by volatilization, the reactor is sealed and the reaction is run under at least autogenous pressure. Preferably, the reactor is provided with temperature regulation means which permit rapid heating or cooling of the contents. Suitable reactor lining materials are high silica glass or tantalum metal, for example.

When the desired growth ratio has been reached, the reaction mixture is cooled and the product particles separated, as by filtering, centrifuging or decanting. The product is washed with water and may be used directly as a "wet cake" or dried.

It is important to select a combination of reaction temperature, chloride concentration and nucleant "concentration" in the reaction slurry such that an excessive growth rate does not result. At high growth rates, the hydrolysate tends to accrete as "spikes" or "branches" on the nucleus crystals, rather than in the essentially parallel disposition required for uniformity of particle diameter and high efficiency of light scattering.

Hydrolysis temperature

At temperatures below 80°C., the rate of particle growth is impracticably low. At temperatures above 150°C., the growth rate is too high. Also, the corrosiveness and vapor pressure of the system increases rapidly above 150°C. It is highly preferred to operate within the range of 90°–110°C., where growth rates are adequately high and operating pressures of from 0 to a few psi (gauge) suffice.

Chloride concentration

The minimum operable chloride concentration is related to the dissolved titanium concentration, since the smallest amount of chloride associated with the titanium corresponds to the formula $TiOCl_2$. Thus, at a minimal titanium content of 0.1 grams per liter, the chloride concentration is at least $71/48 \times 0.1 = \sim 0.15$ grams per gram of titanium, or $2 \times 0.1/48 = \sim 0.004$ gram ions per liter. The effect of chloride concentration on growth rate is sufficient to afford some control. Higher concentrations result in lower growth rates. Thus, by going to a higher chloride level, the temperature can be increased somewhat without an increase in growth rate occurring. The chloride concentration also has an apparent effect on conversion. That is, the degree of hydrolysis achieved in a given finite reaction period varies inversely with the chloride concentration. For example, typical 2 hour hydrolyses carried out at 110° and at 150° showed higher final contents of dissolved titanium at higher chloride contents:

| Temperature | Final Titanium Concentration At | | |
|---|---|---|---|
| | $(Cl^-) = 6$ | $(Cl^-) = 7$ | $(Cl^-) = 8$ |
| 110° | 0.8g/liter | 2g/liter | 6g/liter |
| 150° | 0.3 | 0.6 | 2 |

The apparent direct effect of temperature on conversion is also shown in the above data. These effects are characterized as "apparent" because true equilibration is not achieved in practicable reaction times under the conditions employed.

The foregoing considerations require that a balance be struck between the several effects of chloride concentration and accordingly, a level in the range of 5 to 7 gram ions per liter is preferred.

Dissolved titanium concentration and nucleant level

The rate of hydrolysate precipitation is proportional to a power of the concentration, $(Ti)^x$, with $x$ being between 1.5 and 2. At concentrations above about 60 grams per liter the rate of accretion becomes excessive and control of particle shape is lost. In a batch hydrolysis, the effect of the dissolved titanium concentration is not independent of the number (and size) of the particles in the solid phase. The more particle surfaces presented for growth, the lower the rate of accretion (growth) per particle at a given rate of hydrolysate precipitation. Thus, better control can be maintained in the face of higher dissolved titanium levels if higher nucleant levels are employed.

If a continuous process is being operated, it is advantageous (speaking practically) to have a high nucleant level and the system can be controlled by the rate of addition of dissolved titanium. In this case, the "steady state" titanium concentration can be as low as 0.1 g. per liter if other conditions are such that the soluble titanium accretes (as hydrolysate) to the growing particles about as fast as it is being added to the system. Generally, however, a dissolved titanium concentration of from about 5 to 30 grams per liter is preferable.

The nucleant level (wt. ratio of titanium contents in nucleus crystals and solution) can range from 1 to 50 percent. The process is operable at a level of less than 1 percent but even at this level very inefficient use of reactor space results. The upper extreme is also imposed by practical considerations. Slurries of such high solids content are difficult to stir, circulate, filter, etc. The process can be operated at what, in effect, is a very high level by circulating the liquid phase through a bed of growing particles contained by filtration means. However, this is a less efficient mode of operation. Preferably, the amount of titanium present as nucleus crystals is 5 to 20 wt. percent of the dissolved titanium.

Phosphate, sulphate and bisulphate concentrations

It has been found that the hydrolysis rate and rutile content of the hydrolysate are adversely effected by multivalent anions such as phosphate, sulphate and bisulphate. The process can be operated at sulphate levels as high as 0.01 gram ions per liter but phosphate levels above 0.001 gram ions per liter are generally not operable. Preferably, the levels of phosphate and sulphate (or bisulphate) are an order of magnitude lower, i.e., are respectively less than 0.0001 and 0.001 gram ions per liter. Since titanium ores comprise quite appreciable amounts of acid leachable phosphate, titanium chloride solutions such as hydrochloric acid leaches of ilmenits must be essentially freed of phosphate (as by ion-exchange) in order to be suitable for the practice of the instant invention.

Residence time

Growth ratios of about 2 can be achieved on nucleus crystals contacted with suitable titanium chloride solutions for as little as about 3 minutes. Under conditions of temperature, titanium concentration and chloride concentration previously indicated as not resulting in excessive growth rates, a growth ratio as high as 4 can be reached in as short a time as 12 minutes. However, a contact time of from ½ to 2 hours is preferred. Residence times of up to 50 hours or more are operable, particularly when nucleus crystals having aspect ratios of 100 or more are employed and conditions are such that a slow growth rate prevails.

Preparation of suitable titanium chloride solutions

Titanium chloride solutions for the practice of the present invention can be obtained in several ways. For example, anhydrous titanium tetrachloride can be reacted with ice according to U.S. Pat. No. 3,425,796 to provide a concentrated solution having a chloride to titanium ratio corresponding approximately to the formula $TiOCl_2$. This can then be diluted with water and/or hydrochloric acid to the desired composition. Alternatively, titanium tetrachloride can be reacted with water if means are provided for dealing with the considerable heat and HCl evolution involved. The hydrolysis can be moderated if, for example, hydrochloric acid is employed as the water source material. Hydrochloric acid leaching of titanium ores, such as ilmenite, will provide titanium chloride solutions. However, these must be essentially freed of impurities detrimental to the formation or end use of the rutile particles of the invention. Such impurities are, for example, phosphate, and sufficient amounts of iron to discolor the product. Also, it will generally be necessary to reduce the chloride concentration of the leach, as by evaporation, for example.

Preparation of suitable nucleants

Monocrystalline rutile hydrolysates prepared from iron free leaches of ilmenite ores according to the '484 patent (Long et al.) are suitable as nucleants for the practice of the instant invention. Since these crystals are of relatively low aspect ratio to start with, high growth ratios will necessarily result in a more significant change in shape for the product particle vs. the nucleus crystal. Consequently, a choice must be made between relatively low growth ratios or a reduced scope of utility of the product particles as pigments. Also, nucleants prepared according to said patent are less preferred because high hydrolysis temperatures (or calcining) must be resorted to in order to assure high contents of the requisite monocrystalline nucleus crystals.

Generally similar considerations apply to the similar rutile crystals made by the process of the '773 patent (Surls, et al.), wherein a titanium chloride solution comprising from 6 to 11 gram ions of chloride per liter is hydrolyzed at 85°–150°C. and the resulting hydrolysate is then treated at 175°–300°C. with dilute hydrochloric acid (or with a less corrosive acid, such as nitric acid).

An alternative two step process to that of the '773 patent has also been discovered. An acidic aqueous titanium chloride solution containing from 0.5 to 4.5 gram ions of chloride per liter and from 10 to 60 grams of dissolved titanium per liter is maintained at 100°–150°C. under at least autogenous pressure for 1 to 2 hours in admixture with a colloidal hydrous titanium dioxide seed dispersion (2–50% level; prepared, for example, as described in the '484 patent) and the resulting polycrystalline $TiO_2$ hydrolysate is then contacted at 200°–250°C. under at least autogenous pressure for from ¼ to 4 hours with one of the following: 0.01 to 5.5 M aq. HCl, 0.01 to 20 M aq. $HNO_3$ or 0.01 to 20 M $HClO_4$. By this method there are produced — under minimally corrosive conditions — rutile monocrystals of relatively low aspect ratio and small diameters which are suitable for use as nucleus crystals for the preparation of the composite pigment particles of the instant invention. This alternative route to relatively low aspect ratio nucleus crystals is part of the instant invention.

More preferred as nucleants are needleform rutile monocrystals claimed in and prepared according to U.S. patent application Ser. No. 167,786, filed July 29, 1971 in the names of D. L. Bauer, J. P. Surls and B. F. West as inventors. An acidic titanium chloride solution derived from a pure source material, such as $TiCl_4$, and having a high (9.3–13 gram ions/liter) chloride content is hydrolyzed at a temperature of 120°–325°C. in the presence of a rutile seed. The seed is either a colliodal dispersion of a type such as that described in the '484 patent or is an monocrystalline rutile needle product obtained by a previous such hydrolysis with a colloidal seed. The titanium chloride solution comprises form 20 to 120 grams of titanium per liter and the seed is employed in an amount sufficient to provide an additional amount of titanium of from 0.5 to 25 wt. percent of the dissolved titanium. The product needles obtained by this process have aspect ratios of from 20 to 200 and diameters of from 0.01 to 0.5 microns.

The hydrolysates produced by the latter process at temperatures below about 220° comprise minor amounts of non-rutile particles. For example, at a temperature of about 150°, a dissolved titanium content of about 40 grams per liter, a chloride concentration of about 9.5 g ions per liter and a seed level of about 2% the latter process produces a $TiO_2$ hydrolysate consisting predominantly of needleform rutile crystals, the balance being peptizeable brookite and anatase particles. Such hydrolysates can be employed directly as nucleants in the instant process, but preferably the brookite and anatase particles are first largely removed, as by peptization with dilute acid and filtration.

It is thus possible to produce the instant composite pigment particles in an integrated sequence of operations, such as the following, without exceeding a temperature of 150° in any stage:

1. $TiCl_4$ is reacted with water at a temperature of 50°–70°C. and HCl removed as necessary to provide a "$TiOCl_2$" concentrate comprising about 200 grams per liter of dissolved titanium and from 2 to 3 (preferably 2) gram ions of chloride per gram ion of titanium.

2. A portion of concentrate is diluted with water to a titanium content of from 4 to 30 (preferably 8–15) grams per liter and agitated without appreciable backmixing at a temperature of 70°–150° (preferably about 80°–100°) for a period — depending on the temperature — of from 60 to 0.1 minutes, preferably 30 to 2 minutes. Heating to temperature (or subsequent cooling, if the seed is not to be used immediately) is accomplished in a period of not over 20 minutes and preferably in 1 to 2 minutes. The resulting seed is a pearly, opalescent suspension of colloidal rutile particles.

3. An acidic titanium chloride solution containing from 2–80 (preferably 20–50) grams of titanium and 9.3–13 (preferably 9.5–10) gram ions of chloride per liter is provided, as by dilution of concentrate with hydrochloric acid of appropriate concentration or by mixing $TiCl_4$ and hydrochloric acid. Seed from the preceding step is added in the amount of 0.1 to 50 (preferably 4–10) wt. percent of the dissolved titanium content of the solution and the mixture maintained at 125°–200°C. (preferably not over 150°) for 0.5 to 90 (preferably 1–4) hours.

4. If the resulting hydrolysate comprises any non-rutile particles, these may be (preferably, are) largely removed by peptization and filtration.

5. The hydrolysis of the instant invention is carried out as above described, employing nucleus crystals formed in the preceding step, and the composite product particles are recovered.

The important considerations in carrying out foregoing steps 2 and 3 are the effects of the reaction variables in both steps on the amount and quality of the product of step 3.

In step 2, shorter residence times at temperature and lower temperatures tend to enhance the formation (in step 3) of rutile over non-rutile $TiO_2$, but also tend to lower the yield of solids (hydrolysate). Shorter residence times also tend to result in greater rutile diameters (diameter in 110 plane determined by X-ray diffraction) for the hydrolysate particles. Preparation of the seed from more dilute "$TiOCl_2$" solutions (lower dissolved titanium concentrations) is essential to high yields of hydrolysate (in step 3) and results in higher rutile contents in the hydrolysates.

A good compromise for step 2 is a holding time of about 10 minutes at 85°C. (or about 5 minutes at 100°C.) with a titanium concentration of 10–15 grams per liter and a chloride to titanium ratio of about 2. Seed prepared under these conditions gives a high yield of high rutile content hydrolysate in step 3.

In step 3, higher yields of hydrolysate and higher rutile contents result at higher dissolved titanium concentrations but the rutile diameter tends to fall off. A minimum of about 9 to 9.5 g. ions of chloride per liter is required (at 150°C.) to get dispersed, monocrystalline rutile needles which can be separated from the non-rutile fines. Increasing the chloride concentration beyond this point leads to lower hydrolysate yields. Higher seed levels generally tend to effect an increase in yield (but the seed dispersion must itself be more concentrated if excessive reduction in dissolved titanium concentrations is not to result by addition of higher proportions of seed). Hydrolysis temperatures above 150° give larger rutile diameters and higher hydrolysate yields as well as higher rutile contents.

A good compromise for step 3 is hydrolysis at a titanium concentration of about 40 grams per liter, a chloride concentration of about 9.8 grams per liter, a seed level of about 4%, a temperature of 150° and a residence time at temperature of about 2 hours (under autogenous pressure).

EXAMPLE 1

Steps 1 and 2

A seed dispersion was prepared from an aqueous solution of titanium chloride comprising about 15 g. Ti/liter and about 24 g. Cl/liter. The solution was brought to a temperature of about 85°, maintained at that temperature for about 12 minutes and then cooled to room temperature. Mild stirring was employed. The resulting product was a turbid, opalescent colloidal dispersion of hydrous titanium oxide particles.

Step 3

The seed dispersion was mixed in a ratio of one volume to ten with a solution of $TiCl_4$ in hydrochloric acid, the solution containing about 37 g. Ti/liter and about 412 g. Cl/liter. The resulting mixture thus contained about 35 g. (0.73 g. atom) Ti/liter and about 377 grams (10.6 gram ions) of chloride per liter (Cl/Ti atomic ratio = ~14.5; wt. ratio Ti in seed to Ti in master solution = ~0.04).

The mixture of seed and master solution was heated at 150° for 2 hours under autogenous pressure and with moderate stirring in a glass lined Pfaudler reactor. Filtration, acid washing and drying gave a 78% yield of product, based on the total titanium charged to the reactor. By X-ray diffraction, this product consisted of Brookite (53%) and rutile (47%) having an average diameter in the 110 plane of 410 Angstroms (0.04 microns) by line broadening. A representative sample of the unfractionated product was deposited on a colloidion slide surface by dipping the slide into a vial containing a mixture of product and hexane under supersonic vibration (to effect dispersion) and then allowing the hexane to evaporate. Electron photomicrographs of the slide were then prepared at magnifications of 13,000 and 50,000 and examined. The product particles were found to have a diameter range of from 0.01 to 0.1 microns, a length range of from 0.1 to 3.0 microns and an average length to diameter ratio of about 50 to 1 (some up to 60 to 1). The rutile particles were determined by electron diffraction (dark field technique) to be monocrystalline. The Reynolds tinting strength of the product was determined to be about 500, by the procedure commonly used for rating $TiO_2$ pigments and described in the '484 patent.

Step 4

A portion of the product slurry was filtered and the brookite fines were removed by redispersion and washing with 0.1 M HCl and filtering. The filter-cake (needle seed fraction) corresponded to 59% of the starting product and consisted of 89% rutile of about 0.043 microns average diameter and about 11% of unseparated brookite fines by X-ray diffraction analysis. The needle seed fraction had a tinting strength of 1200, an average rutile diameter of 0.05 microns and an average rutile length of about 3.5 microns.

Step 5; practice of the instant invention

A starting hydrolysis mixture was prepared by suspending 2.08 grams of the preceding $TiO_2$ needle product (dry weight basis) in 200 ml. of a solution containing 7.3 g/l soluble Ti, 6 g. ions/l chloride and no phosphate or sulphate. This mixture was introduced into a glass reaction flask and heated to 100°C. under atmospheric pressure. To the stirring mixture was continuously added a solution containing 80 g/l soluble Ti and 6 g. ions/l chloride, at a rate of 1 ml/min. A sample of the resulting slurry was removed at various time intervals. Each product was examined for light scattering efficiency by tinting strength measurements.

The effect of chloride level on growth was examined by repeating the experiment at chloride levels of 5 and 7 g. ions/liter. The results of all three growth studies are given in Table I.

TABLE I

HYDROLYSIS STUDY

Titanium Chloride Solution Added Continuously to 100°C. Hydrolyses Nucleated With Needle Monocrystal Fraction of Step 3 Hydrolysate

| Sample Time Min. | Ratio: g/l Soluble Ti to g. Ions of Cl⁻/l | Gram Ions Per Liter Cl⁻ | Nucleant g. Ti/l | Ratio Soluble Ti to Nucleant | Soluble Ti Added g/l | Sol. Ti Found g/l | Sol. Ti Ppt'd. g/l | Total Prod. g Ti/l | Growth Ratio, Prod. Nucl. | T.S.⁵ Dry | Product Composition % R¹ | % B² | % A³ | Avg. Rutile Diam.⁴ A |
|---|---|---|---|---|---|---|---|---|---|---|---|---|---|---|
|  |  | 5.0 | 5.46 | 1.1 | 6.0 | — | — | 5.5 | 1.0 | 1200 |  |  |  |  |
| 10 | 1.31 |  | 5.20 | 1.7 | 8.9 | 6.6 | 2.3 | 7.5 | 1.4 | 1550 | 91 | 0 | 9 | 380 |
| 30 | 2.80 |  | 4.74 | 3.0 | 14.0 | 6.4 | 7.6 | 12.3 | 2.6 | 1850 |  |  |  |  |
| 50 | 3.74 |  | 4.30 | 4.4⁻ | 18.7 | 5.7 | 13.0 | 17.6 | 4.1 | 1750 | 88 | 0 | 12 | 300 |
| 80 | 0.96 |  | 3.73 | 6.7 | 24.8 | 4.8 | 20.0 | 23.7 | 6.3 | 1550 |  |  |  |  |
| 110 | 0.54 |  | 3.35 | 8.7⁻ | 29.0 | 2.7 | 26.3 | 29.7 | 8.9 | 1330 |  |  |  |  |
|  |  | 6.0 | 5.68 | 1.5 | 7.3 | — | — | 5.7 | 1.0 | 1200 | 89 | 9 | 2 | 430 |
| 10 | 1.49⁻* |  | 5.35 | 2.2 | 11.6 | 8.9 | 2.7 | 8.1 | 1.5 | 1550 | 91 | 5 | 4 | 365 |
| 20 | 1.52 |  | 5.11 | 2.8 | 14.4 | 9.1 | 5.3 | 10.4 | 2.0 | 1750 |  | sum |  |  |
| 30 | 1.40 |  | 4.95 | 3.3 | 16.5 | 8.4 | 8.1 | 13.1 | 2.6 | 1900 | 95 | 5 |  | 330 |
| 40 | 1.40 |  | 4.72 | 4.2 | 19.7 | 8.4 | 11.3 | 16.0 | 3.4 | 1850 |  |  |  |  |
| 60 | 1.35 |  | 4.31 | 5.8 | 24.8 | 8.1 | 16.7 | 21.0 | 4.9 | 1650 |  | sum |  |  |

TABLE I-continued

HYDROLYSIS STUDY

Titanium Chloride Solution Added Continuously to 100°C. Hydrolyses Nucleated With Needle Monocrystal Fraction of Step 3 Hydrolysate

| Sample Time Min. | Ratio: g/l Soluble Ti to g. Ions of Cl⁻/l | Composition | | | | | | | | | Product Composition | | | Avg. Rutile Diam.[4] A |
|---|---|---|---|---|---|---|---|---|---|---|---|---|---|---|
| | | Gram Ions Per Liter Cl⁻ | Nucleant g. Ti/l | Ratio Soluble Ti to Nucleant | Soluble Ti Added g/l | Sol. Ti Found g/l | Sol. Ti Ppt'd. g/l | Total Prod. g Ti/l | Growth Ratio, Prod. Nucl. | T.S.[5] Dry | % R[1] | % B[2] | % A[3] | |
| 100 | 0.67 | | 3.86 | 8.0 | 30.8 | 4.0 | 26.8 | 30.7 | 8.0 | 1450 | 96 | | 4 | 190 |
| | — | 7.0 | 5.46 | 1.3+ | 7.3 | — | — | 5.5 | 1.0 | 1200 | | | | |
| 20 | 1.60 | | 5.00 | 2.7 | 13.5 | 11.2 | 2.3 | 7.3 | 1.5 | 1500 | 88 | 6 | 6 | 390 |
| 40 | 1.89 | | 4.56 | 4.3 | 19.5 | 13.2 | 6.3 | 10.9 | 2.4 | 1850 | | | | |
| 60 | 1.97 | | 4.13 | 6.1 | 25.1 | 13.8 | 11.3 | 15.4 | 3.7 | 1850 | 87 | 0 | 13 | 330 |
| 80 | 1.76 | | 3.69 | 8.0 | 30.8 | 12.3 | 18.5 | 22.2 | 6.0 | 1650 | | | | |
| 100 | 1.06 | | 3.69 | 8.0 | 30.8 | 7.4 | 23.3 | 27.0 | 7.3 | 1550 | | | | |

[1] R = rutile
[2] B = brookite
[3] A = anatase
[4] by X-ray line broadening
[5] T.S. = Tinting Strength
* A chloride to titanium ratio of about 0.67 g. ions/g. or about 0.017 atomic ratio.

The progressive decrease in average 110 rutile diameter from the initial to final samples in each set will be noted. At first, the larger core needles are the only rutile "crystallites" present but as the forming particles grow, these are considerably outnumbered by the increasingly higher proportion of crystallites clustered around them. The growing "bundle" is no longer a single crystal and its overall diameter does not affect the determination.

The average diameters of the growing particles at 20, 30, 60 and 100 minutes (6 g. ions Cl /litter set) were calculated by multiplying the square roots of the growth ratios by 0.05, the average diameter of the nuclei crystals. Dividing these into the average lenght (3.5 microns) of the nuclei crystals gave the respective average aspect ratios of the product particles. The values so found are given in the following Table Ia.

TABLE Ia

| | Product Particle Properties | | | | |
|---|---|---|---|---|---|
| Sample Time | Tinting Strength | G.R.* | (G.R.)$^{1/2}$ | Avg. Diam. Microns | Average Aspect Ratio |
| 20 | 1750 | 2.0 | 1.41 | 0.07 | 50 |
| 30 | 1900 | 2.6 | 1.61 | 0.08 | 47 |
| 60 | 1650 | 4.9 | 2.21 | 0.11 | 32 |
| 100 | 1450 | 8.0 | 2.83 | 0.14 | 25 |

* G.R. = Growth Ratio

The preceding example not only constitutes a growth study but also illustrates a semi-continuous mode of operation of the instant process invention.

EXAMPLE 2

An acidic aqueous titanium chloride solution containing 35 g./liter of titanium and 10 g. ions/liter of chloride was mixed with a colloidal TiO₂ seed (4% level), heated to 150°C. and maintained at that temperature for 2 hours. The resulting hydrolysate was filtered out, washed with water and stored as a wet cake under dilute (0.2M) hydrochloric acid.

Nucleant samples were obtained as needed for the following experiments by redispersing the wet cake in the dilute acid, withdrawing a portion and filtering. In this manner peptizeable non-rutile fines were removed to provide a "needle fraction" as the filtrand from each sample. A number of hydrolyses were carried out with the different nucleant portions in sealed glass ampoules at different nucleant levels and under several conditions of temperature and chloride concentration, as shown in the following tables. Agitation was provided by rocking the bomb in which the ampoules were heated. The titanium chloride solutions used were derived from TiCl₄ and contained no detectable amounts of phosphate, sulphate or bisulphate.

TABLE II.—NUCLEANT AND HYDROLYSIS STUDY

| Tube No. | Hydrolysis, temp. and time | Nucleant | Hydrolysis mixture—Composition | | | Recovery | | Growth ratio, prod. seed | Dried product | | | | |
|---|---|---|---|---|---|---|---|---|---|---|---|---|---|
| | | | | | | | | | | X-ray | | | |
| | | | | | | | | | | | Percent | | |
| | | | G. Ti/l. | G. ions/l. of Cl | Percent nucleant | Soluble, g. Ti/l. | Percent ppt'd | | Tint strength | Rutile | Brookite | Anatase | Rutile size, A. |
| A-1 | 110° C., 2 hours | 72 wt. percent of orig. wet cake. | 30.4 | 6.0 | 12 | 0.75 | 97.7 | 8.6 | 1,000 | | | | |
| A-2 | | | 29.9 | 6.0 | 15 | | | 7.7 | 1,050 | | | | |
| A-3 | | | 29.7 | 6.0 | 18 | 0.82 | 97.3 | 6.4 | 1,300 | | | | |
| A-4 | | 80% R, 19% B, 1% A, 390 A. rutile diam. | 29.6 | 6.0 | 21 | | | 5.4 | 1,350 | | | | |
| A-5 | | | 29.5 | 6.0 | 24 | 0.80 | 97.2 | 5.1 | 1,450 | | | | |
| A-6 | | | 30.4 | 7.0 | 12 | 2.2 | 92.9 | 8.2 | 1,150 | | | | |
| A-7 | | | 29.9 | 7.0 | 15 | | | 7.3 | 1,250 | | | | |
| A-8 | | | 29.7 | 7.0 | 18 | 2.1 | 93.2 | 6.1 | 1,350 | | | | |
| A-9 | | | 29.6 | 7.0 | 21 | | | 5.2 | 1,450 | | | | |
| A-10 | | | 29.5 | 7.0 | 24 | 2.0 | 93.5 | 4.8 | 1,550 | | | | |
| A-11 | | | 29.9 | 8.0 | 15 | 5.4 | 82.1 | 6.5 | 1,650 | | | | |
| A-12 | | | 29.6 | 8.0 | 21 | 9.3 | 68.5 | 3.9 | 1,650 | | | | |

Table II—Continued

| Tube No. | Hydrolysis, temp. and time | Nucleant | Hydrolysis mixture—Composition | | | Recovery | | Growth ratio, prod./seed | Dried product | | | | |
|---|---|---|---|---|---|---|---|---|---|---|---|---|---|
| | | | G. Ti/l. | G. ions/l. of Cl | Percent nucleant | Soluble, g. Ti/l. | Percent ppt'd | | Tint strength | X-ray Percent Rutile | Brookite | Anatase | Rutile size, Å |
| B-1 | 150° C. | 77 wt. percent of orig. wet cake. | 30.4 | 6.0 | 12 | | | 9.0 | 1,150 | 90 | 6 | 4 | 250 |
| B-2 | | | 30.2 | 6.0 | 15 | | | 7.5 | 1,300 | | | | |
| B-3 | | | 29.9 | 6.0 | 18 | 0.30 | 99.0 | 6.5 | 1,450 | | | | |
| B-4 | | 71% R, 28% B, 1% A, 550 Å. rutile diam. | 29.5 | 6.0 | 21 | | | 5.6 | 1,500 | | | | |
| B-5 | | | 29.0 | 6.0 | 24 | 0.27 | 99.1 | 5.3 | 1,500 | 90 | 10 | 0 | 360 |
| B-6 | | | 30.4 | 7.0 | 12 | 0.62 | 98.0 | 8.9 | 1,300 | | | | |
| B-7 | | | 30.2 | 7.0 | 15 | | | 7.4 | 1,450 | | | | |
| B-8 | | | 29.9 | 7.0 | 18 | 0.60 | 98.0 | 6.4 | 1,550 | | | | |
| B-9 | | | 29.5 | 7.0 | 21 | | | 5.6 | 1,650 | 90 | 10 | 0 | 290 |
| B-10 | | | 29.0 | 7.0 | 24 | 0.66 | 97.8 | 5.2 | 1,650 | | | | |
| B-11 | | | 30.2 | 8.0 | 15 | 1.85 | 93.9 | 7.1 | 1,650 | 85 | 7 | 8 | 410 |
| B-12 | | | 29.5 | 8.0 | 21 | 2.33 | 92.1 | 5.2 | 1,650 | | | | |
| C-1 | 150° C., 2 hrs., tubes. | 71 wt. percent of org. 78% R, 19% B, 3% A, 410 Å. rutile diam. | 30.2 | 6.0 | 20 | 0.27 | 99.1 | 6.0 | 1,450 | | | | |
| C-2 | | | 29.8 | 6.0 | 30 | 0.36 | | 4.3 | 1,550 | 89 | 4 | 7 | |
| C-3 | | | 29.4 | 6.0 | 50 | 0.26 | | 3.0 | 1,350 | | | | |
| C-4 | | | 28.6 | 6.0 | 80 | 0.26 | | 2.2 | 1,200 | 86 | 12 | 2 | |
| C-5 | | | 29.9 | 7.0 | 15 | 0.79 | 97.4 | 7.6 | 1,400 | 93 | 3 | 4 | |
| C-6 | | | 30.2 | 7.0 | 20 | 0.66 | | 5.9 | 1,450 | | | | |
| C-7 | | | 30.3 | 7.0 | 25 | 0.93 | | 5.0 | 1,600 | 94 | 0 | 6 | |
| C-8 | | | 29.8 | 7.0 | 30 | 0.68 | | 4.2 | 1,450 | | | | |
| C-9 | | | 29.4 | 7.0 | 40 | 0.64 | 97.8 | 3.4 | 1,500 | | | | |
| C-10 | | | 29.4 | 7.0 | 50 | 0.69 | | 3.0 | 1,450 | | | | |
| C-11 | | | 29.2 | 7.0 | 60 | 0.54 | | 2.6 | 1,300 | | | | |
| C-12 | | | 28.6 | 7.0 | 80 | 0.63 | | 2.2 | 1,250 | 87 | 5 | 8 | |
| D-1 | 150° C., 2 hrs., tubes. | 82% R, 17% B, 1% A, 410 Å., rutile diam. | 29.4 | 8.0 | 8 | 2 (est.) | 93 | 12.0 | 1,350 | 86 | 11 | 3 | |
| D-2 | | | 30.0 | 8.0 | 12 | | | 8.6 | 1,400 | | | | |
| D-3 | | | 30.1 | 8.0 | 15 | | | 7.2 | 1,650 | 95 | 0 | 5 | |
| D-4 | | | 30.1 | 8.0 | 20 | | | 5.8 | 1,550 | | | | |
| D-5 | | | 29.3 | 8.0 | 40 | | | 3.2 | 1,550 | | | | |
| D-6 | | | 28.5 | 8.0 | 60 | | | 2.5 | 1,350 | 91 | 8 | 1 | |
| D-7 | | | 29.3 | 9.0 | 4 | 6 (est.) | 80 | 17.9 | 1,350 | 94 | 6 | 0 | |
| D-8 | | | 29.4 | 9.0 | 8 | | | 10.3 | 1,400 | | | | |
| D-9 | | | 30.0 | 9.0 | 12 | | | 7.4 | 1,550 | 88 | 12 | 0 | |
| D-10 | | | 30.1 | 9.0 | 20 | | | 5.0 | 1,550 | | | | |
| D-11 | | | 29.3 | 9.0 | 40 | | | 2.8 | 1,450 | | | | |
| D-12 | | | 28.5 | 9.0 | 60 | | | 2.1 | 1,250 | 84 | 13 | 3 | |

The set of hydrolyses designated as "B" in Table II shows the operability of a nucleant comprising as much as 29 wt. % of non-nucleating $TiO_2$ (brookite and anatase).

The data of Table II show that, in general, higher tinting strength products were obtained when higher nucleant levels (more nuclei) were used. At 110°, the product tinting strength was generally lower and the yield lower than at 150°C. Differences in chloride level over the range of from 6 to 9 g. ions per liter did not markedly affect the results.

EXAMPLE 3

Step 2

A colloidal seed dispersion containing 15 g./liter of titanium was prepared as in Step 2 of Example 1. This was concentrated to 50 g./liter by mixing with an equal volume of 12 molar hydrochloric acid and dewatering the resulting coagulate suspension to 12% of volume by centrifuging.

Step 3

The resulting seed concentrate was used at a level of 30% in a 2-hour hydrolysis under autogenous pressure at 150°C. of a solution containing 40 grams of titanium and 10 gram ions of chloride per liter. The hydrolysate accounted for 75% of the total titanium charged.

Step 4

When the hydrolysate was redispersed in dilute hydrochloric acid and filtered, 43% of it was recovered as a 100% rutile needle fraction having an average 110 diameter of 290 Angstroms (0.03 microns).

Step 5

Portions of the needle fraction were used as the nucleant in growth studies at 100° (chloride level 6 g. ions/l) pg,26 and 150° (chloride level 7 g. ions/l). The variations in tinting strength with particle size and growth ratio are shown in Table III:

TABLE III

| Temperature | (Cl⁻) | G.R. | (G.R.)$^{1/2}$ | Avg. Particle Diameter | Tinting Strength |
|---|---|---|---|---|---|
| 100° | 6 | 2 | 1.4 | 0.04 microns | 1150 |
| | | 4 | 2 | 0.06 | 1450 |
| | | 9 | 3 | 0.09 | 1560 |
| | | 9.5 | 3.1 | 0.09 | 1560 |
| | | 16 | 4 | 0.12 | 1300 |
| | | 21 | 4.6 | 0.14 | 1180 |
| 150° | 7 | 15 | 3.9 | 0.12 | 1570 |
| | | 28 | 5.3 | 0.16 | 1370 |
| | | 48 | 7⁻ | 0.20 | 1060 |

EXAMPLE 4

Deleterious effect of phosphate anion on hydrolysis rate and hydrolysate tinting strength.

A. A needle fraction was obtained as in Step 4 of Example 1 from a portion of the product slurry made in Step 3 of the same Example. This needle fraction was closely similar to that described in Example 1 and was employed as the nucleant in an attempted growth study. An amount of needle fraction which provided 5 grams of titanium (as $TiO_2$) per liter of mixture was mixed with amounts of water, 0.36 molar aqueous phosphoric acid and 12 molar aqueous hydrochloric acid such that the resulting slurry had a volume of 200 cc., contained 6 g. ions of chloride per liter and was 0.01 molar in phosphoric acid ($H_3PO_4$). This was heated to 100°C. and to it was added 20 cc. of an acidic titanium chloride solution containing 100 grams of dissolved titanium and 6 gram ions of chloride per liter. The mixture was stirred at a temperature of ~100°C. for 80 minutes and 50 cc. of the chloride solution was added at a rate of 1 cc. per minute. At 10 minute intervals, samples of the reaction slurry were withdrawn. Growth ratios, tinting strengths, and dissolved titanium concentrations were determined as shown in the following Table IV:

TABLE IV

| Sample Time | Init. Vol. cc | Ti, Soln Add. cc | Sample Out cc | Final Vol. cc | Seed Present g. Ti/l | Diss. Ti Add. g/l | Anal. Sol. Ti g/l | Ppt'd Ti g/l | Total Solids g. Ti/l | Growth Ratio Product/ Seed | T.S. Dry |
|---|---|---|---|---|---|---|---|---|---|---|---|
| Start | 200 | — | — | 200 | 5.00 | — | — | — | 5.0 | 1.0 | 1250 |
| -0min | 200 | 20 | — | 220 | 4.55 | 9.1 | — | — | — | — | — |
| 10 | 220 | 9 | 20 | 209 | 4.37 | 12.7 | 13.3 | Nil | 4.4 | 1.0 | 1200 |
| 20 | 209 | 11 | 20 | 200 | 4.15 | 17.0 | 16.9 | Nil | 4.2 | 1.0 | 1200 |
| 30 | 200 | 10 | 15 | 195 | 3.95 | 21.0 | 20.9 | Nil | 4.0 | 1.0 | 1250 |
| 40 | 195 | 11 | 15 | 191 | 3.74 | 25.2 | 25.4 | Nil | 3.7 | 1.0 | 1150 |
| 50 | 191 | 9 | 10 | 190 | 3.57 | 28.6 | 27.8 | 0.8 | 4.4 | 1.2 | — |
| 60 | 190 | — | 10 | 180 | 3.57 | 28.6 | 22.3 | 6.3 | 9.9 | 2.8 | — |
| 80 | 180 | — | 10 | 170 | 3.57 | 28.6 | 5.2 | 23.4 | 27.0 | 7.0 | 950 |

Essentially no growth occurred until about 70 cc. of chloride solution had been added, i.e., until the phosphate concentration was appreciably less (due to samples removed between additions) than 200/270 × 0.01 or < 0.0074 moles/liter. The tinting strength of the product at a growth ratio of 7 was only 950, as compared to about 1500 at a comparable ratio in Example 1 (6 g. ions Cl⁻/liter). X-ray analysis of the solid phase from the 60 minute sample (growth ratio 2.8) showed 81% rutile and 19% brookite with an average rutile diameter of 200 Angstroms. Thus, in comparison to the composition of the nucleant (see Example 1), as well as from the drop off in tinting strength with "growth" shown in the preceding talbe, it is evident that the hydrolysate which did form in the instant experiment was not rutile.

B. Three identical portions of an acidic titanium chloride solution containing 30 l grams of titanium per liter and 7 gram ions of chloride per liter were mixed (18% level) with essentially identical portions of a rutile needle nucleant closely similar to that described in Example 2. One mixture was made 0.01 molar in phosphoric acid and another 0.01 molar in sulfuric acid, while nothing was added to the third mixture. After 2 hours at 150°C. (sealed tubes), the solid phase in each mixture was separated, weighed and analyzed by X-ray. The results are given in Table IV-B:

TABLE IV-B

| Additive Concentration | Tinting Strength | Percent Rutile | Percent Brookite | Anatase | Average Rutile Diam. |
|---|---|---|---|---|---|
| -0- | 1750 | 90 | 9 | 1 | 270A |
| 0.01 M $SO_4^=$ | 1050 | 65 | 26 | 9 | 280 |
| 0.01 M $PO_4^\equiv$ | 800 | 12 | 4 | 88 | 430 |

C. In tests similar to test B preceding, it is found necessary to reduce the level of phosphate to 0.001 molar in order to get appreciable growth of rutile on the nucleus needles and bisulphate ($HSO_4^-$) is found to be equivalent to sulfate ion as a poison.

EXAMPLE 5 Utility for Paper Opacification.

A growth study was carried out at 100°C. (atmospheric pressure) using a needle nucleant essentially the same as that described in Example 2 with an aqueous solution derived from anhydrous $TiCl_4$ and containing about 35 grams of titanium and about 7 g. ions of chloride per liter. The product particles present at a growth ratio of 15 had a tinting strength of 1,450 and showed a performance relative to a commercial anatase pigment of 130% in a paper opacification test (based on the TAPPI* 425 m-60 standard procedure as follows).

Evaluation of $TiO_2$ as Opaque Filler for Paper

The $TiO_2$ sample was dispersed in water at pH 8 using an ultrasonic disperser and NaOH as required for pH control. 5.0 g. of sample was used to prepare 0.5 l of 1% pigment solids. Bleached Kraft softwood pulp was soaked in water and refined in a laboratory size Valley Beater to a Canadian Standard Freeness of 350. A sample of the beaten pulp was diluted in a beaker and the appropriate volume of pigment dispersion was added to obtain the desired filler level of 0, 4 or 6% based on the weight of paper. The mixture was stirred and adjusted to pH 5.5 and then flocculated by the addition of $Al_2(SO_4)_3$ solution at 40 lbs. alum per ton of pulp and Separan PG-2 solution at 0.5 lbs. per ton. The entire flocculated mixture was diluted further in water, divided into five equal portions, and each was made into a sheet of paper measuring 8 inches by 8 inches and weighing about 2.5 g. dry. The sheets were made by standard procedures using a Noble and Wood Hand Sheet machine. Five replicate sheets were prepared at each $TiO_2$ filler level. In a similar fashion test sheets were made using the reference or standard $TiO_2$ filler, (DuPont LW anatase).

The paper sheets were conditioned overnight in an atmosphere of ca 20°C., 50% relative humidity and \* Technical Association of the Pulp and Paper Industry then weighed. Three of each replicate set were chosen with weights closest to 2.48 g. and these were used to determine the opacity and brightness at each filler level. Reflectance measurements were made with a Bausch & Lamb Spectronic 505 reflectometer at 550 nm. which had been calibrated using an N.B.S. standard opaque white plate. For each set 8 replicate determinations were made of total reflectivity or brightness ($R_\infty$) on a thick pad of the paper. In a similar way 16 replicate measurements were made of the opacity ($R_o$) on single sheets of the paper backed by a black glass substrate of zero reflectivity. The amount of $TiO_2$ filler in each set was determined by standard gravimetric ashing procedures.

The treatment of data was done by computer using a program based on the Kubelka-Munk expressions of light scattering and absorption. These are discussed and related to testing of paper in Tappi standard T425 M-60 entitled "Opacity of Paper". Using the measured $R_o$ and $R_\infty$ values, the R.89 value was computed from the relationship:

$$R.89 = [R_o - .89 (2aR_o - 1)/1 - .89 R_o]$$

where $a = (^1/R_\infty + R_\infty)/2$

R.89 is the reflectance of a single sheet of paper backed by a white substrate with a reflectivity of 89%. The final expression of opacity and brightness of the paper is a contrast ratio known as Tappi Opacity $R_o$/R.89. The experimental results were corrected to a standard basis weight of 60 g./M² or, its equivalent, 2.48 g. per 8 × 8 sheet.

The relative opacifying power of the test sample to the standard was determined by plotting the respective Tappi Opacity verus the filler content. From such a plot the amount of $TiO_2$ required to attain T.O. = 80 was 5.00% for the standard anatase and 3.85% for the test sample. Expressed as a ratio indicating relative performance the test sample was 130% of the standard under the given conditions.

Tests by the same procedure on higher tinting strength products made by the instant process show better than 130% performance relative to LW anatase.

If desired, the composite particles of the instant invention can be converted to rutile monocrystals having tinting strengths of up to 2100 or more by calcining in the conventional manner.

Physical/Chemical Characterization of Product Particles

Composite pigment particles prepared according to the preceding examples are characterized by electron microscopy as to size and shape using the conventional sample preparation procedure for dry powder samples. A dispersion of the dry powder is prepared in distilled water using pH control and ultrasonic waves to insure adequate dispersion into the unit acting particle. A dispersion concentration of about 0.1 mg. of powder in one cubic centimeter of water is used. A portion of this dispersion is sprayed onto 200A thick carbon reinforced nitrocellulose films supported on 200 mesh electroformed copper screens. These specimens are observed with an electron microscope (Hitachi Hu1 1A, for example) in the high resolution transmission position at 100 KV accelerating voltage. The magnification of the microscope is determined by photographing a 28,800 line/inch replica of an optical grating.

The actual characterization of the internal structure of the particle is also done by electron microscopy using ultra thin sectioning techniques to reveal the structure in cross section.

To accomplish this a 100 – 500 mg. sample of washed, salt-free filter cake of the product particles is suspended in 10 cc. of absolute ethyl alchol to replace the water and mixed 10 – 15 minutes using ultrasonic techniques. Following this the particles are sedimented (as in a Sorvall GLC-1 centrifuge at 4,000 rpm). The supernatant ethanol is decanted and the sedimented particles resuspended in fresh absolute ethanol. This suspension and sedimentation step is repeated until the particles are free of residual water. The alcohol is then replaced in a similar fashion with propylene oxide as a transitional solvent using two or three volume replacement washings. The particles are embedded in an epoxy resin using a graded series of resins in the transitional solvent propylene oxide, i.e., 90/10 (propylene oxide/epoxy resin) (75/25, 50/50, 25/75, 100%) (epoxy resin). The $TiO_2$ particles are suspended in each resin component for 30 – 45 minutes, centrifugally sedimented and the sediment transferred to the next higher resin concentration, repeating this procedure until the particles are brought into equilibrium with 100% epoxy resin. The impregnated crystal resin specimen is transferred to gelatin capsules and heat polymerized to yield a mechanically hard block suitable for ultra-thin sectioning. Using an ultramicrotome equipped with a diamond knife sections are prepared that measure 400 – 600A in thickness for study in the transmission electron microscope. The electronmicroscopy is carried out with an electron microscope, such as the Hitachi HU1 1A, at 100 KV using a 60° wide angle tilting stage especially designed for crystallographic orientation studies. The instrument is calibrated with a 54.864 line/inch replica of a diffraction grating.

A sample of a typical growth product, essentially identical to that of Example 2 (group C, tube No. 5), was characterized as follows. Bright field examination in a thin section revealed that the bulk cross section was circular and 1,000 to 1,800 Angstroms in diameter but with fine structural detail. High magnification study revealed that these bulk particles were composed of two distinct sizes of crystals in a unique relationship to one another. The particles consisted of a central core or nucleus of one or more larger crystals measuring 250 to 500 Angstroms (0.025–0.05 microns) in diameter surrounded by densely packed irregular layers of much smaller crystallites measuring 0.002 to 0.02 microns in diameter. Dark field examination and electron diffraction in the electron microscope revealed that the larger nucleus crystals were rutile with the fiber axis lying along the [002] crystallographic direction, i.e., perpendicular to the plane of the micrograph. From the sharp bright-to-dark contrast reversal observed by tilting the specimen one to three degrees off the [002] orientation, the smaller crystallites were also identified as rutile and determined to have a predominant [002] fiber orientation.

Examination of a range of such growth products has shown that the interstitial space between the smaller crystallites comprising the bulk of the total particle is non-rutile in nature and its relative volume varies from 1–10% of the total particle volume depending upon the particular crystal preparation condition. When the specific product sample ablve described was examined the nucleus or seed crystal was found to represent 8.3% of the particle volume, the surrounding growth on this seed crystal consisted of smaller (50–200 Angstrom) rutile crystallites which accounted for 87.6% of the total particle volume with the interstitial non-rutile volume measuring approximately 4.1%.

Sections were prepared at approximately 45° to the fiber axis corresponding to the [302] crystallographic direction. This grazing angle section showed that the smaller crystallities were parallel with the fiber axis of the nucleus or seed crystal. The morphology of the small crystallites was therefore determined to be acicular. From this section study they were found to be monocrystalline and greater than 0.1 micron (1,000A) in length.

Examinations of the range of composite particles made by the process of the instant invention shows that the rutile crystallites which accrete to the nucleus crystals range in length from 0.025 to 2 microns, in diameter from 0.005 to 0.05 microns and have aspect ratios of from 5 to 50.

We claim:

1. A process for the preparation of composite titanium dioxide pigment particles, each consisting of one or more elongate rutile monocrystals having lengths within the range of from 0.15 to 15 microns, diameters within the range of 0.01 to 0.1 microns and aspect ratios of from 5 to 200, surrounded by similarly elongated rutile crystallites having lengths within the range of 0.005 to 0.05 microns, diameters within the range of 0.01 to 0.1 microns and aspect ratios of from 5 to 50 and from 1 to 10 volume percent of interstitial non-rutile titanium dioxide, which comprises:

contacting said rutile monocrystals for at least 3 minutes with an acidic aqueous titanium chloride solution under at least autogenous pressure and at a temperature of from 80° to 150°C., thereby causing cross-sectional particle growth by deposition on said monocrystals of titanium dioxide hydrolysate in the form of said crystallities disposed with said interstitial titanium dioxide around said monocrystals in a configuration generally parallel thereto and continuing said contact until a growth ratio of up to about 18 has been achieved;

said solution containing from 0.1 to 60 grams of dissolved titanium per liter, from 0.004 to 9 gram ions of chloride per liter, not more than 0.001 gram ions of phosphate per liter and not more than 0.01 gram ions of sulphate and/or bisulphate per liter; and the weight of titanium present in said monocrystals being from 1 to 50 percent of the weight of dissolved titanium in said solution 2. The process of claim 1 additionally comprising preparing said rutile monocrystals by
   1. providing a mixture of an acidic aqueous titanium chloride solution containing from 0.5 to 4.5 gram ions of chloride and from 10 to 60 grams of dissolved titanium per liter with a colloidal hydrous titanium dioxide seed suspension providing an additional amount of titanium which is from 2 to 50 weight percent of the dissolved titanium in said solution,
   2. maintaining said mixture at a temperature of from 100° to 150°C. under at least autogenous pressure from from 1 to 2 hours, thereby producing a polycrystalline titanium dioxide hydrolysate,
   3. converting the polycrystalline hydrolysate formed in the preceding step (2) to said rutile monocrystals by contacting it at a temperature of from 200° to 250°C. under at least autogenous pressure for from ¼ to 4 hours with an aqueous acid selected from the group consisting of 0.01 to 5.5 molar hydrochloric acid, 0.01 to 20 molar nitric acid and 0.01 to 20 molar perchloric acid.

3. The process of claim 1 in which the rutile monocrystals have diameters of from 0.01 to 0.04 microns and lengths of at least 1 micron.

4. The process of claim 1 in which said contacting is discontinued when said resultant particles have attained an average effective diameter of from 0.08 to 0.12 microns.

5. The process of claim 1 in which the chloride concentration in said solution is from 5 to 7 gram ions per liter, the dissolved titanium concentration is from 5 to 30 grams per liter, the weight of titanium in the monocrystals is from 5 to 20 percent of the weight of the dissolved titanium and the contacting is continued for from 1/2 to 2 hours at a temperature of from 130° to 150°C.

* * * * *